No. 875,433.
PATENTED DEC. 31, 1907.
W. HUBBARD.
WAGON.
APPLICATION FILED OCT. 8, 1906.
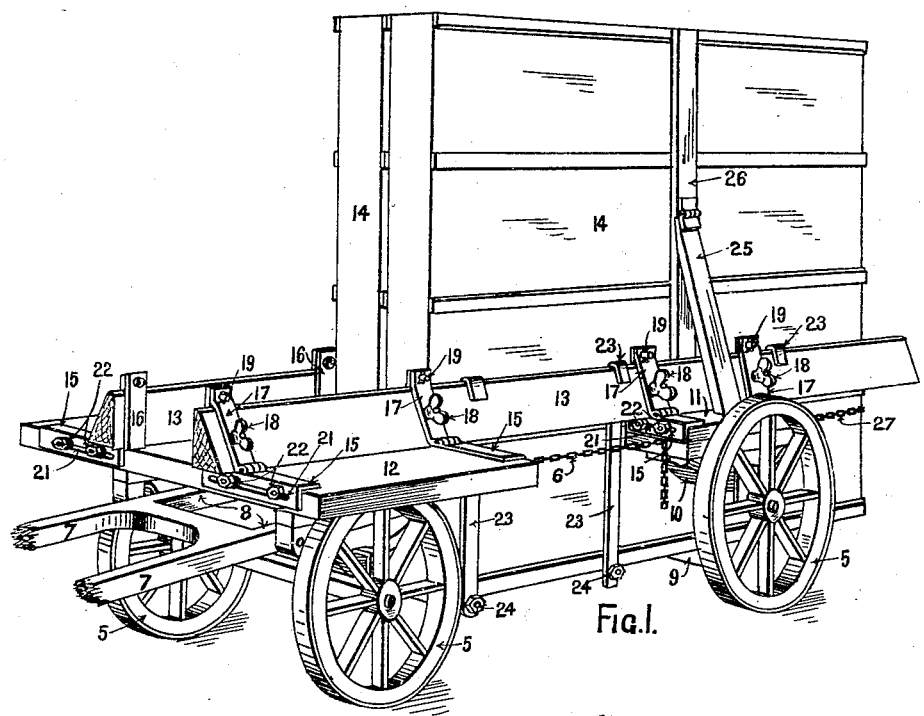
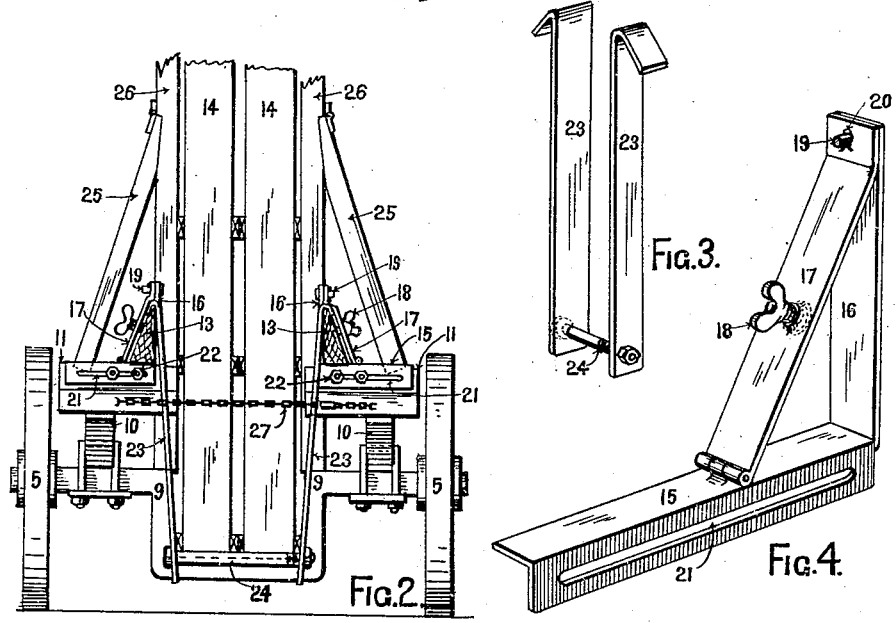
Witnesses.
Inventor.
William Hubbard.
by Chas. H. Riches
his attorney

UNITED STATES PATENT OFFICE.

WILLIAM HUBBARD, OF DULWICH HILL, NEAR SYDNEY, NEW SOUTH WALES, AUSTRALIA.

WAGON.

No. 875,433.  Specification of Letters Patent.  Patented Dec. 31, 1907.

Application filed October 8, 1906. Serial No. 337,954.

*To all whom it may concern:*

Be it known that I, WILLIAM HUBBARD, a subject of the King of Great Britain and Ireland, of Woodland street, Dulwich Hill, near Sydney, in the State of New South Wales, in the Commonwealth of Australia, have invented certain new and useful Improvements in Wagons to Facilitate the Handling of Large Cases Containing Plate-Glass or the Like; and I do hereby declare that the following is a full, clear, and exact description of the same.

This invention refers to improvements in wagons for carrying large cases such as plate glass cases and other cumbersome goods, the object of the invention being to provide a wagon onto which large cases may be easily loaded and then carried with safety. But in order that the invention may be clearly understood reference will now be made to the accompanying sheet of drawings in which:—

Figure 1 is a perspective view showing the wagon loaded with two cases. Fig. 2 an end view. Fig. 3 an enlarged perspective view of the strap support. Fig. 4 a similar view of the fastening attachment.

The wagon consists of two lorry bodies with draft wheels 5 connected together by means of chains 6. The shafts 7 of the leading lorry have back extensions 8 so as to maintain them in a raised position. The draft wheels 5 of the back lorry are of a larger diameter and have a crank shaped axle 9 upon which are mounted springs 10 supporting a divided platform 11. Upon the platform 12 of the leading trolley and the platforms 11 of the back lorry rest two longitudinal beams 13 so that when the bodies are thus jointed together a complete vehicle is formed fitted to carry large crates or cases on edge. The space between the beams 13 is regulated to the requirement of the cases 14 by fastening devices hereinafter called "beam-holders", consisting of an angle iron base 15 having at one end a vertical turn-up 16. To the base 15 is hinged a flap 17 having midway a set screw 18 and jointed to the vertical turn-up 16 by a bolt 19 and split pin 20, see Fig. 4. The base 15 has a slot 21 on its vertical side which is serrated and has tightening bolts or thumb screws 22 see Fig. 4. The beams 13 have iron straps or brackets 23 hooked upon them in such a manner that the brackets on one of the beams will correspond with those upon the other and form pairs. These pairs have at their bottom ends adjustable bolts 24 passing therethrough so as to form rests for the cases 14, see Fig. 3. Upon the platform 11 are recesses for the diagonal stays 25 hinged to struts 26, said struts resting upon the axle 9. The cases 14 having been placed in position on the bolts 24 the struts 26 are placed in position and the beams 13 are then drawn into close contact therewith and the thumb screws or nuts 22 in the slots 21 of the beam holders are then tightened. The chain 27 which passes round the back of the cases 14 is also tightened.

What I claim and desire to secure by Letters Patent is:—

An improved wagon to facilitate the handling of large cases consisting of a pair of lorry bodies and draft wheels connected together by a pair of longitudinal beams, said beams being adapted to move laterally to receive between them, cases of different dimensions and to be held in such desired position; a series of straps or brackets suspended from the said beams, each pair of which is connected at the bottom by a cross bolt, said bolts forming the rests for the case or cases to be carried substantially as described and illustrated in the drawings.

In testimony whereof he affixes his signature in the presence of two witnesses.

WILLIAM HUBBARD.

Witnesses:
 WALKER SIGMOND,
 WILLIAM NEWTON.